C. W. BARTON.
OBJECT HOLDER FOR PROJECTION APPARATUS.
APPLICATION FILED DEC. 2, 1912.
1,158,429.
Patented Nov. 2, 1915.
2 SHEETS—SHEET 1.
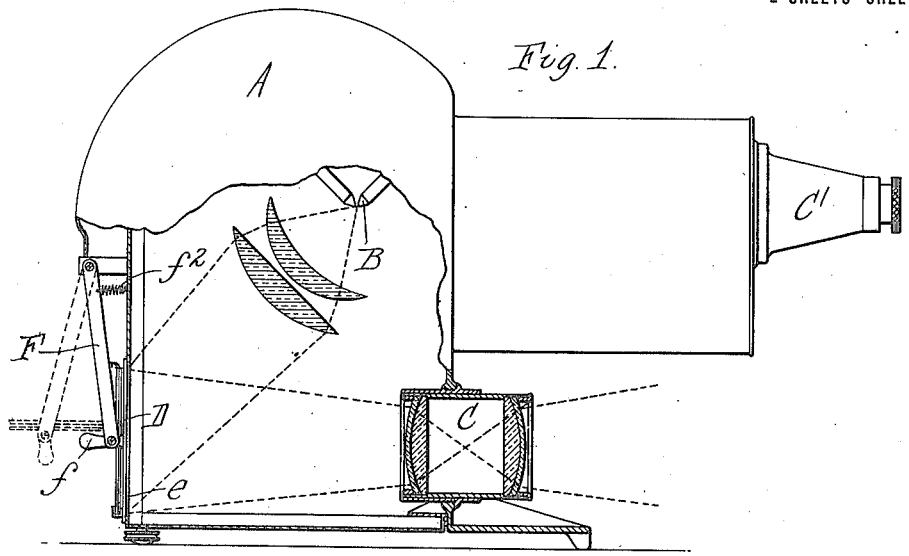
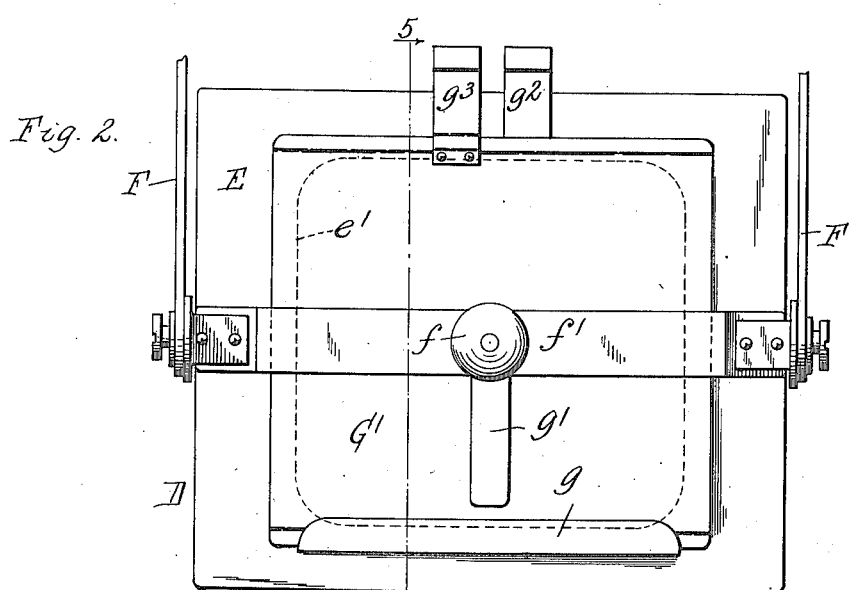
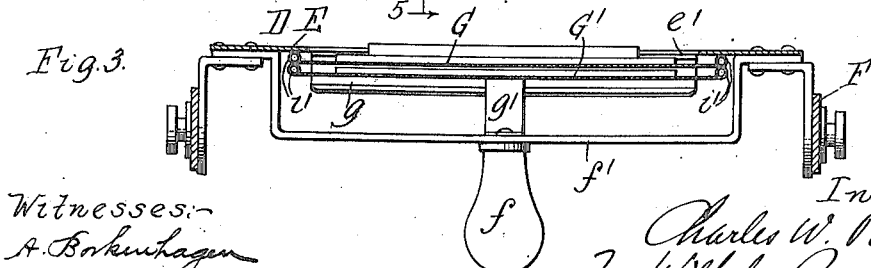

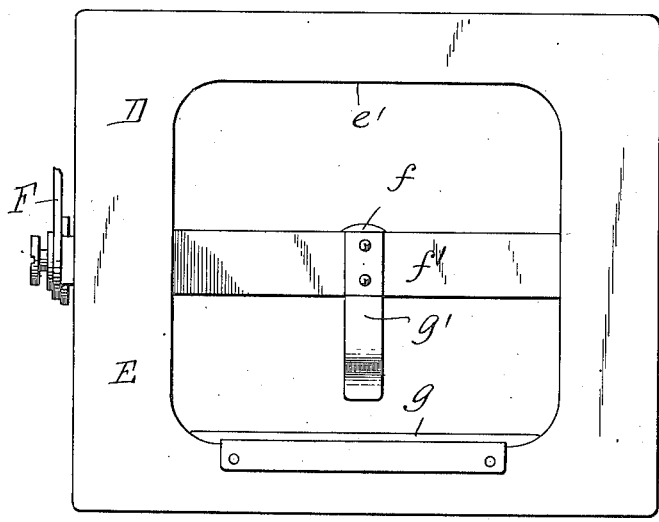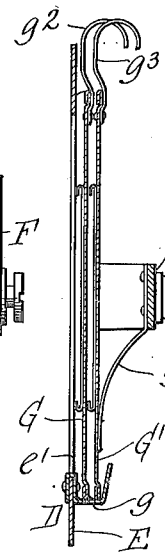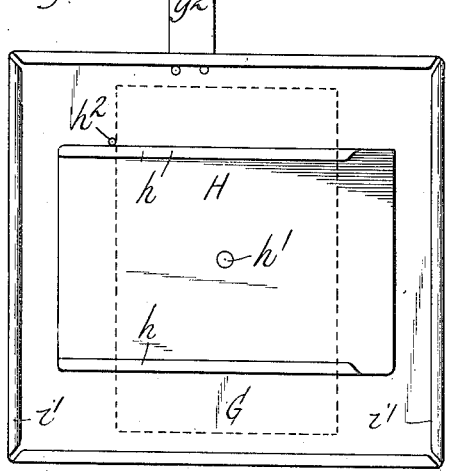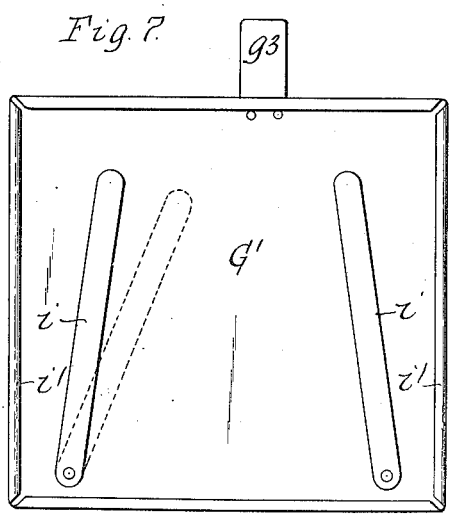

UNITED STATES PATENT OFFICE.

CHARLES W. BARTON, OF BUFFALO, NEW YORK, ASSIGNOR TO SPENCER LENS COMPANY, OF BUFFALO, NEW YORK.

OBJECT-HOLDER FOR PROJECTION APPARATUS.

1,158,429.  Specification of Letters Patent.  Patented Nov. 2, 1915.

Application filed December 2, 1912. Serial No. 734,433.

*To all whom it may concern:*

Be it known that I, CHARLES W. BARTON, a subject of the King of Great Britain, residing at Buffalo, in the county of Erie and State of New York, have invented a new and useful Improvement in Object-Holders for Projection Apparatus, of which the following is a specification.

This invention relates to improvements in optical projection apparatus, and more particularly to object holders for opaque projection apparatus or reflectoscopes by which images of opaque objects are projected.

One object of the invention is to provide an object holder which is adapted to hold cards, pictures and analogous flat opaque objects, and is constructed so as to facilitate the placing of the objects in and their removal from the holder and so that the cards or objects can be quickly and easily changed for successive projections.

Another object of the invention is to construct the holder so that it is adapted for holding either cards and other flat objects, or books and other objects of a bulkier nature.

In the accompanying drawings consisting of two sheets: Figure 1 is a side elevation, partly in section, of a projection apparatus provided with an object holder embodying the invention. Fig. 2 is a rear elevation on an enlarged scale of the object holder detached. Fig. 3 is a horizontal sectional plan of the holder. Fig. 4 is a front elevation of the holder with the object carriers or slides removed. Fig. 5 is a sectional elevation of the holder in line 5—5, Fig. 2. Fig. 6 is a front elevation of one of the object slides or carriers removed from the holder. Fig. 7 is a similar view of an object slide or carrier adapted for holding cards and other flat objects which vary in size.

Like reference characters refer to like parts in the several figures.

A represents the casing of a projection apparatus; B the lamp or illuminating device thereof; and C the objective for projecting images of opaque pictures or objects. The apparatus illustrated in Fig. 1 is of that sort which is adapted for projecting images from both opaque objects and transparent objects or lantern slides, and it is provided, in addition to the objective C for the opaque work, with an objective C' for transparent work, the lamp being movably mounted so as to be placed in operative relation to the objective for either kind of work, but this invention is concerned only with the holder for the opaque objects, and this holder may be applied to an opaque projection apparatus of any other suitable construction.

D represents the object holder which is mounted exteriorly on the casing A, so as to support the object in the focal plane just in rear of an opening $e$ in the rear wall of the casing, through which the rays of light from the lamp are directed onto the object. The holder comprises a movable support or frame and object carriers or slides which are removably supported by the frame. The frame preferably consists of a rectangular sheet metal plate E which is provided with an opening $e'$ of suitable size to expose the object on the slide or carrier supported by the frame, and is supported by links or arms F which are suitably pivoted at their upper ends on the casing A and at their lower ends centrally to the frame at the opposite ends thereof, so that the frame can be swung with the supporting arms toward and from the rear wall of the casing A and can be turned from a vertical position to a horizontal or inclined position on the arms. A handle $f$ of any suitable form, connected by a bail or yoke $f'$ to end portions of the plate E, serves for thus manipulating the holder.

$f^2$ represents springs of any suitable kind connected to the supporting arms F for pressing the holder frame against the rear wall of the casing A to hold the object stationarily in operative position.

G G' represent the object slides or carriers which are supported one behind the other on the plate E in rear of the opening $e'$ in the frame. As shown, the object slides or carriers rest on a shelf or ledge $g$ projecting rearwardly from the plate E at the bottom of the opening $e$ therein and are held in place between the plate E and a spring strip or finger $g'$ secured to the yoke or bail $f'$, the object slides or carriers being thus adapted to be slid downwardly between the plate E and the spring $g'$ until they rest on the supporting shelf or ledge $g$, and to be removed from the holder by pulling them upwardly from between the plate and the spring $g'$. Each slide or carrier is provided at its upper edge or portion with a hook or handle adapted to be grasped for slipping the slide into and out of the frame, the handles $g^2$ and $g^3$ for the carriers G and G' being arranged at opposite sides of the centers of the holder, or out of line with each other, so that one handle will not interfere with the other in inserting and removing the slides or carriers. Each slide or carrier is provided at its front side with means of any suitable sort for holding a card, picture or analogous flat object. For instance, the carriers as shown in Fig. 6 may be provided on their front sides with card retainers H consisting of rectangular sheet metal plates with inbent opposite edges $h$ between which a card or similar flat object is adapted to be slipped. This retainer is especially adapted for post cards and the like of uniform size. The retainer H is preferably pivoted centrally on the slide or carrier at $h'$, so that it can be turned to either the horizontal or vertical position, indicated by full and dotted lines in Fig. 6, for the purpose of holding the card with its greater dimension either horizontally or vertically as may be necessary. A stop pin or projection $h^2$ on the slide or carrier is adapted to engage the retainer H to hold it in its vertical or horizontal position.

The slide or carrier G' shown in Fig. 7 is provided on its front side with pivoted spring clips or strips $i$ which are adapted to be moved toward or from each other, as may be necessary, for holding pictures or other flat objects of different sizes. The slides or carriers of both forms are preferably provided at their opposite ends with beads or flanges $i'$ which strengthen the slides and serve to space the slides or carriers from the plate E and from each other sufficiently to permit them to be slipped into and out of the frame without disturbing the objects carried thereby or their retainers.

Two carriers or slides of the form shown in Fig. 6 and two slides or carriers of the form shown in Fig. 7 are preferably furnished for each apparatus, so that two carriers of whichever sort may be necessary, depending upon the kind of objects or cards being used, are provided. It will be understood, however, that only two of the slides or carriers are used at one time in the holder.

In the use of the apparatus a card, picture or other flat object is placed in each of the two slides or carriers, and the slides or carriers are slipped into the holder one behind the other. After the picture or object on the front slide or carrier has been displayed this slide or carrier is pulled upwardly out of the holder leaving the other slide or carrier with its card or object in position ready for projection, and while this latter card or picture is being displayed the operator places a new card or object in the slide or carrier which has been removed from the holder and slips the slide or carrier into the holder back of the other slide or carrier. Thus a card or object can be placed in one slide or carrier while the card or object in the other slide or carrier is being displayed, and the cards or objects can be quickly and conveniently changed. The holder frame can be moved backwardly from the casing A and the frame turned to a horizontal or other position thus permitting an object to be readily secured and adjusted thereon, whenever this may be necessary. Since the holder is bodily movable toward and from the casing a picture, book or other object which is too large to be held on one of the slides or carriers can be placed between the frame plate E and the back of the casing A, where it will be held in position by the pressure of the plate E thereon. The holder is, therefore, not only capable of rapid and easy manipulation but it is also adapted for holding a great variety of pictures and other objects of various sizes and shapes.

I claim as my invention:

1. The combination with a projection apparatus, of a plurality of object carriers each provided with means for retaining an object thereon, means for supporting said object carriers one behind the other with the object on the front carrier in the focal plane, said object carriers being movable independently of each other into and out of said supporting means, and means for moving the rear object carrier to place the object thereon in the focal plane when the front carrier is removed, substantially as set forth.

2. The combination in a projection apparatus, of a plurality of object carriers each provided with means for retaining an object thereon, and a support in which said object carriers are supported one behind the other with one in position for projection, said object carriers being movable independently of each other into and out of said support, said support being movable with the object carriers thereon to and from the operative position, substantially as set forth.

3. The combination in a projection apparatus, of a plurality of object carriers each provided with means for retaining an object thereon, a support on which said object carriers are supported one behind the other with the object on the front carrier in position for projection, said object carriers being independently removable from said support, said support being mounted to move with said object carriers thereon to and from operative position, and means for moving the rear object carrier forwardly on the support to place the object thereon in position for projection when the front carrier is removed, substantially as set forth.

4. The combination in a projection apparatus, of a plurality of object carriers each provided with means for retaining an object thereon, a support on which said object carriers are supported one behind the other with the object on the front carrier in the focal plane, said object carriers being independently removable from said support, and a spring acting against said object carriers for moving the second carrier to place the object thereon in the focal plane when the front carrier is removed, substantially as set forth.

5. The combination with the casing of a projection apparatus, of a plurality of object carriers each provided with means for retaining an object thereon, and a support for holding said object carriers one in front of the other with the object on the front carrier in the focal plane of said apparatus, said support being mounted on said casing to move toward and from the focal plane, and said object carriers being independently slidable into and out of said support, substantially as set forth.

6. The combination with the casing of a projection apparatus, of an object carrier provided with means for retaining an object thereon, and a support for holding said object carrier with the object in the focal plane of said apparatus, said support being mounted on said casing to move broadside toward and from the focal plane, and to swing to a position at an angle to said focal plane to facilitate the removal of the object carrier, said object carrier being removable from said support, substantially as set forth.

7. The combination in a projection apparatus, of a casing provided with an opening therein, a plurality of object carriers each provided with holding means for an object, and a support on which said object carriers are adapted to be supported one in front of the other outside of said casing with the objects facing the opening in said casing, said support being movable to move said carrier to and from operative position and having a guide in which said object carriers are slidable into and out of position on said support, substantially as set forth.

8. An object holder for projection apparatus comprising a frame and a plurality of object carriers which are provided with holding means for objects and are slidably supported by said frame one behind the other, said object carriers having handles arranged out of line with each other for sliding the carriers into and out of said frame, substantially as set forth.

9. An object holder for projection apparatus comprising a frame having an opening therein substantially in the focal plane, a plurality of object carriers which are slidably supported by said frame one behind the other in rear of said opening and are independently removable from said frame, and a spring for moving the rear object carrier forwardly against said frame when the object carrier in front of the same is removed from the frame, substantially as set forth.

10. The combination with the casing of a projection apparatus provided with an opening, of a support for an object carrier having an open side facing said opening in the casing and a guide into which a plurality of object carriers can be slid edgewise into and out of said support, means movably connecting said support to said casing to move the open side thereof toward and from the opening in the casing into and out of position for holding an object in the focal plane, and object carriers which are removably held by said support and each of which is provided with means for retaining an object thereon, substantially as set forth.

11. The combination with the casing of a projection apparatus having an opening therein, of an object holder comprising a frame with an open side facing the opening in the casing, links pivoted to said casing and to said holder on which the holder is movable toward and from the casing and is adapted to tilt relative to the casing, said holder having a guide into which a plurality of object carriers can be slid edgewise into and out of said holder, substantially as set forth.

Witness my hand this 27th day of November 1912.

CHARLES W. BARTON.

Witnesses:
 CORA FACKLAM,
 H. N. OTT.